United States Patent
Keshavan et al.

(10) Patent No.: US 8,763,881 B2
(45) Date of Patent: Jul. 1, 2014

(54) METHODS OF HARDBANDING JOINTS OF PIPE USING FRICTION STIR WELDING

(75) Inventors: Madapusi K. Keshavan, The Woodlands, TX (US); Russell J Steel, Salem, UT (US); Cary A. Roth, Spring, TX (US); Shelton W. Alsup, Houston, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 12/541,651

(22) Filed: Aug. 14, 2009

(65) Prior Publication Data

US 2010/0038407 A1    Feb. 18, 2010

Related U.S. Application Data

(60) Provisional application No. 61/088,856, filed on Aug. 14, 2008.

(51) Int. Cl.
*B23K 20/12*    (2006.01)

(52) U.S. Cl.
USPC ............ 228/112.1; 228/2.1; 228/245

(58) Field of Classification Search
USPC ................................. 228/2.1, 112.1
See application file for complete search history.

(56) References Cited

U.S. PATENT DOCUMENTS

| | | | |
|---|---|---|---|
| 4,256,518 A | 3/1981 | Bolton et al. | |
| 4,665,996 A | 5/1987 | Foroulis et al. | |
| 5,244,559 A | 9/1993 | Latz | |
| 6,045,028 A * | 4/2000 | Martin et al. | 228/112.1 |
| 6,309,762 B1 * | 10/2001 | Speckert | 428/683 |
| 6,375,865 B1 | 4/2002 | Paulson et al. | |
| 6,375,895 B1 * | 4/2002 | Daemen | 420/105 |
| 6,450,395 B1 | 9/2002 | Weeks et al. | |
| 6,601,475 B2 * | 8/2003 | Davies et al. | 76/108.2 |
| 6,861,612 B2 * | 3/2005 | Bolton et al. | 219/121.64 |
| 7,105,205 B2 | 9/2006 | Clayton et al. | |
| 7,124,929 B2 | 10/2006 | Nelson et al. | |
| 7,240,821 B2 * | 7/2007 | Talwar | 228/175 |
| 7,270,257 B2 | 9/2007 | Steel et al. | |
| 7,361,411 B2 | 4/2008 | Daemen et al. | |
| 2002/0054972 A1 | 5/2002 | Charpentier et al. | |
| 2005/0082342 A1 | 4/2005 | Babb et al. | |

(Continued)

FOREIGN PATENT DOCUMENTS

| | | |
|---|---|---|
| EP | 1690627 A2 | 8/2006 |
| JP | 11-20432 | 1/1999 |

(Continued)

OTHER PUBLICATIONS

J.G. Mobley et al. A metallurgical approach to the design of hardbanding alloys; World Oil.com, The oilfield information source, vol. 229, No. 1, Jan. 2008 (9 pages).

(Continued)

*Primary Examiner* — Devang R Patel
(74) *Attorney, Agent, or Firm* — Osha Liang LLP (57) ABSTRACT

A method for applying a wear reducing material to a tool used in a wellbore operation that includes welding a hardfacing alloy to a surface of the tool, wherein the welding comprises friction stirring the alloy into the tool's surface is disclosed. Methods of welding a preformed sleeve or width of wear reducing material using friction stirring are also disclosed.

20 Claims, 5 Drawing Sheets

(56) References Cited

U.S. PATENT DOCUMENTS

| | | | |
|---|---|---|---|
| 2005/0139640 A1* | 6/2005 | Kay | 228/112.1 |
| 2006/0049234 A1* | 3/2006 | Flak et al. | 228/112.1 |
| 2006/0102354 A1 | 5/2006 | Gammage et al. | |

FOREIGN PATENT DOCUMENTS

| | | |
|---|---|---|
| JP | 2004-263568 | 9/2004 |
| JP | 2006-218543 | 8/2006 |
| JP | 2007313541 A * | 12/2007 |
| KR | 10-0762940 | 10/2007 |

OTHER PUBLICATIONS

J. Truhan et al. Wear and friction of hard-faced claddings; Block-on-ring test configuration shows that cladding microstructure in new developmental alloys effects both cladding and casing wear; World Oil.com, The oilfield information source, vol. 229, No. 3, Mar. 2008 (8 pages).

S. Eickhoff, Titanium-based hardbanding aims to balance protection for wear in casing, tool joints; Downhole Tools, Drilling Contractor, Mar./Apr. 2007 (2 pages).

Joe Haberer, Viable drill pipe hardbanding strategies are outlined, Drilling Contractor, Nov./Dec. 2000 (2 pages).

Joyce Berger, et al., The NanoSteel Company Pioneers Downhole solution for Grant Prideco, Resulting in Revolutionary New Tool Joint Hardbanding Material, The NanoSteel News Release, Jun. 2005 (2 pages).

J. G. Mobley, Hardbanding and Its Role in Directional/Horizontal Drilling, SPE 52187 society of Petroleum Engineers, Mar. 1999 (3 pages).

International Search Report and Written Opinion for International Application No. PCT/US20091053642, mailed on Mar. 26, 2010 (6 pages).

Written Opinion filed under Singapore Application No. 201101049-3 on Mar. 23, 2012 (5 pages).

Office Action issued in corresponding Chinese Application No. 200980139473.7 dated Mar. 4, 2013 (16 pages).

International Search Report and Written Opinion issued in related International Patent Application No. PCT/US2009/053642; Dated Feb. 11, 2011 (5 pages).

* cited by examiner

METHODS OF HARDBANDING JOINTS OF PIPE USING FRICTION STIR WELDING

CROSS-REFERENCE TO RELATED APPLICATIONS

This application claims priority, under 35 U.S.C. §119(e), to U.S. Patent Application No. 61/088,856, filed on Aug. 14, 2008, the contents of which are herein incorporated by reference in its entirety.

BACKGROUND OF INVENTION

1. Field of the Invention

Embodiments disclosed herein relate generally to improved tool joints or other wear surfaces used in wellbore operations. In particular, embodiments disclosed herein relate generally to methods of applying wear resistant materials to and otherwise improving the properties of tool joints or other wear surfaces.

2. Background Art

Drilling wells for hydrocarbon recovery involves the use of drill pipes, to which at one end, a drill bit is connected for drilling through the formation. Rotational movement of the pipe ensures progression of the drilling. Typical pipes may come in sections of about 30 feet in length, and thus, these sections are connected to one another by a tool joint. Tool joints are the connecting members between sections of drill pipe—one member (the box) has an internal thread and the mating member (the pin) has an external thread, by which means they are assembled into a continuous unit with the drill pipe to form a drill string. Often, these tool joints have a diameter significantly larger than the body of the pipes, thus requiring protection against wear, particularly when drilling through highly abrasive, highly siliceous earth formations. In particular, as drilling proceeds, the tool joints rub against the drilled hole and/or drilled hole lining (i.e., casing). The strength of the connection is engineered around the wall thickness and heat-treated properties of the box above the thread. During drilling, the wall thickness above the thread thins as it rubs against the wall or casing. Thus, the life of the pipe is predicated upon the remaining strength of the tool joint.

Because increasing the life of the tool joint is desirable, there have been numerous attempts to provide weld a protective hardfacing alloy or cladding to the tool joint (or other wear prone surfaces such as a stabilizer or drill collar) to form a hardband. A variety of methods have been used to apply such wear-reducing materials to joints, including: GMAW (gas metal arc welding), GTAW (gas tungsten arc welding), PTA (plasma transferred arc), and FCAW (flux cored arc welding). These welding processes are characterized by establishing an arc between an electrode (either consumable or non-consumable) and a tool joint base material. Once this arc is established, intense heat forms a plasma. The gas that forms the plasma is furnished by means of an external gas or an ingredient from a tubular wire. The temperature of the plasma is in excess of 10,000 degrees Kelvin and is highest at the center of the weld, and decreases along the width of the weld.

Historically, and in practice, tool joints have been coated with tungsten carbide to resist the abrasion of the rock earth in the drill hole on the tool joint. However, tungsten carbide is expensive, it can act as a cutting tool to cut the well casing in which it runs, and the matrix is a soft steel which erodes away easily to allow the carbide particles to fall away.

Other prior art hardfacing materials used that are harder than siliceous earth materials are brittle and crack in a brittle manner after solidification and upon cooling due to the brittle nature of its structure and the inability of the structure to withstand solidification shrinkage stresses and typically emit sound energy upon cracking as well as causing considerable casing wear as previously stated. These hardfacing materials are alloys which belong to a well-known group of "high Cr-irons" and their high abrasive resistance is derived from the presence in the microstructure of the Cr-carbides of the eutectic and/or hypereutectic type.

Siliceous earth particles have a hardness of about 800 Brinell hardness number (BHN). In U.S. Pat. No. 5,244,559 the hardfacing material used is of the group of high Cr-irons that contains primary carbides which have a hardness of about 1700 Hv in a matrix of a hardness of at least 300 BHN to 600 Hv. These primary carbides at this high hardness are brittle, have little tensile strength and hence pull apart on cooling from molten state at a frequency that depends on the relative quantity of the primary carbides in the mix of metal and carbide. Thus, this type of hardfacing material, which is harder than siliceous earth materials, when applied by welding or with bulk welding, form shrinkage cracks across the weld bead. This material has been applied extensively and successfully during many years for the hardbanding of tool joints and hardfacing of other industrial products.

Although these materials have become and still are widely accepted by the trade, users expressed a desire for a hardbanding tool joint alloy combining casing-friendliness with the capability of being welded free of brittle cracks in order to minimize any concerns of mechanical failure risks. Indeed, in most industries (including the oil and gas industry's use of down hole drilling equipment) the metal components which make up the structure and equipment of a given plant must have integrity, which means being free of any kind of cracks, because such cracks might progress through the piece and destroy the part.

U.S. Pat. No. 6,375,865 describes an alloy having a martensitic-austenitic microstructure which is preheated before welding to the industrial product and cooled down after welding. Alloys of this structural type can be deposited crack-free (further aided by the pre- and post-treatments and are characterized by excellent metal to metal wear properties and low brittleness.

Wear by abrasion mechanisms always has been, and still remains a main concern in many segments of industry, including the drilling industry. However, there is some limitation on the types of materials that may be used due to limitations of their use with GMAW, GTAW, PTA, and FCAW, as well as limitations on the types of materials which do not harm the casing.

Accordingly, there is a continuing need for developments in methods of improving the properties of a tool joint or other wear surfaces by applying treatment techniques and/or material in order to increase the component's service life.

SUMMARY OF INVENTION

In one aspect, embodiments disclosed herein relate to a method for applying a wear reducing material to a tool used in a wellbore operation that includes welding a hardfacing alloy to a surface of the tool, wherein the welding comprises friction stirring the alloy into the tool's surface.

In another aspect, embodiments disclosed herein relate to a method for applying a wear reducing material to a tubular member used in a wellbore operation that includes locating a preformed sleeve of a high melting temperature hardfacing alloy concentric with an outer surface of the tubular member at a desired location; and welding the preformed sleeve to the outer surface of the tubular member, wherein the welding comprises friction stirring the alloy into the tool's outer surface.

In yet another aspect, embodiments disclosed herein relate to a method for applying a wear reducing material to a tool used in a wellbore operation that includes locating a preformed, malleable width of a high melting temperature hardfacing alloy on an outer surface of the tool; and welding the preformed width to the outer surface of the tool, wherein the welding comprises friction stirring the alloy into the tool's outer surface.

Other aspects and advantages of the invention will be apparent from the following description and the appended claims.

DETAILED DESCRIPTION

In one aspect, embodiments disclosed herein relate to formation of hardbands on the surface a tool used in a wellbore operation. In particular, embodiments disclosed herein relate to formation of a hardband weld using friction stir welding.

The methods of the present disclosure may be used to form a hardband or layer of wear reducing material on any type of tool used in a wellbore operations. However, particular embodiments may relate to use of friction stir welding to apply hardbanding to a region of a downhole tool or component having a greater OD than other adjacent components, thus necessitating wear protection for the component. For example, components having a greater OD than other adjacent downhole components may include drill pipe joints, drill collars, stabilizers, etc. However, one skilled in the art would appreciate that the methods of the present disclosure are not so limited, and friction stir welding may instead be used to apply a wear reducing material to any downhole component.

Friction stir welding uses a combination of rotational and orbital motion applied to the interface between the two objects to weld two pieces together. A rotating member is conventionally applied to the interface (joint) and is moved in an orbital fashion until a plasticized state of the material is achieved. The rotating member is moved along the interface to create a bonded seam between the two objects.

Thus, the friction stir welding process generally involves engaging the material of two adjoining workpieces on either side of a joint by a rotating stir pin or spindle. Force is exerted to urge the spindle and the workpieces together, and frictional heating caused by the interaction between the spindle and the workpieces results in plasticization of the material on both sides of the joint. The spindle is traversed along the joint, plasticizing the material at the joint as it advances, and the plasticized material left in the wake of the advancing spindle cools and solidifies to form a weld.

One example operation of a friction stir welding tool is shown in FIGS. 6A to 6D. As shown in FIG. 6A to 6D, two workpieces (e.g., workpieces, 60a, and 60b), are aligned so that edges of the workpieces 60a and 60b to be welded together are held in direct contact along interface 62. A friction stir welding tool 65 has a shoulder 64 at its distal end, and a welding pin 66 extending downward centrally from the shoulder 64. As the rotating tool 65 is brought into contact with the interface 62 between workpieces 60a and 60b, the pin 66 is forced into contact with the material of both workpieces 60a and 60b, as shown. The rotation of the pin 66 in the material produces a large amount of frictional heating of both the welding tool pin 66 and shoulder 64 and at the workpiece interface. The heating tends to soften the material of the workpieces 60a and 60b in the vicinity of the rotating pin 66, thereby inducing a plasticization and commingling of material from the two workpieces 60a and 60b to form a weld 68.

However, as shown in FIG. 6A to 6D and described above in its conventional use, the friction stir welding tool is moved along the interface in such a manner that the pin or spindle of the tool presses into the interface at an orientation that is co-planar with the interface/seam between the two objects. One skilled in the art would appreciate that when applying a wear resistant layer onto an outer surface of a tool, such as a sleeve being welded onto a tubular, the pin or spindle of the friction stir welding tool is oriented perpendicular to the interface or seam plane. Depending on the component being hardbanded and its configuration, one skilled in the art would appreciate that either orientation of the tool may be used.

The types of material that may be hardbanded in accordance with the embodiments disclosed herein may depend on the desired material properties for the particular application, such as hardness, toughness, casing-friendly wear resistance, etc., as well as the type of wellbore in which the tool is being used (cased or open hole). However, in particular embodiments, the hardfacing alloy being hardbanded may include ferrous alloys, such as steel, as well as iron- nickel-, copper-, and cobalt-based alloys. In using friction stir welding, alloys previously unweldable by conventional welding techniques may be welded using friction stirring. Additional elements in the types of materials being welded include, but are not limited to, chromium, molybdenum, manganese, silicon, carbon, boron, tungsten, aluminum, titanium, niobium, tantalum, vanadium, nickel, cobalt, zirconium, phosphorus, and rhenium. Some of these alloys used in hardbanding may be described as "high melting temperature compounds," or compounds having a melting temperature greater than steel. Other such high melting temperature compounds may form the base material of the tool components being used downhole. However, lower melting temperature alloys may also be used. Further, in open-hole drilling (where casing-friendliness is not as necessary), the alloy may be provided with tungsten carbide particles dispersed therein.

In addition to being able to weld a greater number of alloys previously unweldable by conventional welding techniques, a greater hardness of the wear reducing material may be achieved. For example, by using friction stirring a greater hardness by about 5 to 15 Rockwell C points (when comparing a friction stir weld to a conventional weld, using the same material) may be achieved. That is, for an alloy that would have a hardness ranging from 45 to 55 Rockwell C when using conventional welding, a hardness of about 50 to 70 Rockwell C may be achieved when using friction stirring. Such improved hardness may result from the change in the material microstructure (i.e., through grain refinement/recrystallization to produce fine precipitates such as carbides). Another byproduct of the friction stirring techniques of the present disclosure may be a reduction in the surface roughness, i.e., reduced asperity heights, as compared to a conventional weld.

In order to weld the high melting materials used in the present disclosure, referring back to FIG. 6A to 6D, the pin 66 and the shoulder 64 of the friction stir welding tool may be coated with a superabrasive material. In one embodiment, polycrystalline cubic boron nitride (PCBN) may be used as a superabrasive coating on a substrate material being used for the shoulder 64 with the integral pin 66. In a preferred embodiment, rather than a coating, the shoulder 64 and the pin 66 (which may or may not be integrally formed with the shoulder) are formed of polycrystalline cubic boron nitride themselves, rather than being coated. Tools suitable for use in the methods of the present disclosure may include tools similar to those discussed in U.S. Pat. Nos. 7,124,929, 7,270,257, and U.S. Patent Publication No. 2005/0082342, which are assigned to the present assignee and herein incorporated by reference in their entirety.

Figure 1:
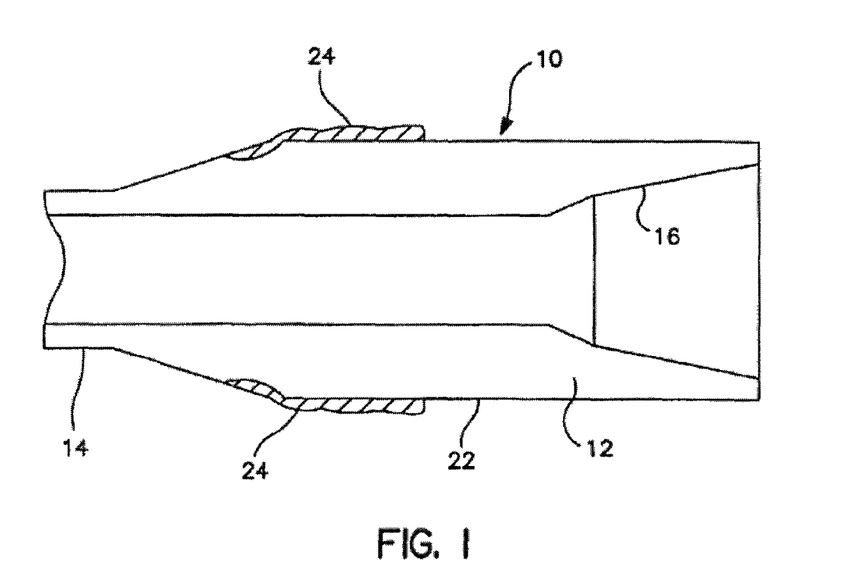
FIG. 1 is a fragmentary longitudinal sectional view of a box of a tool joint with a raised hardband according to one embodiment.
Figure 2:
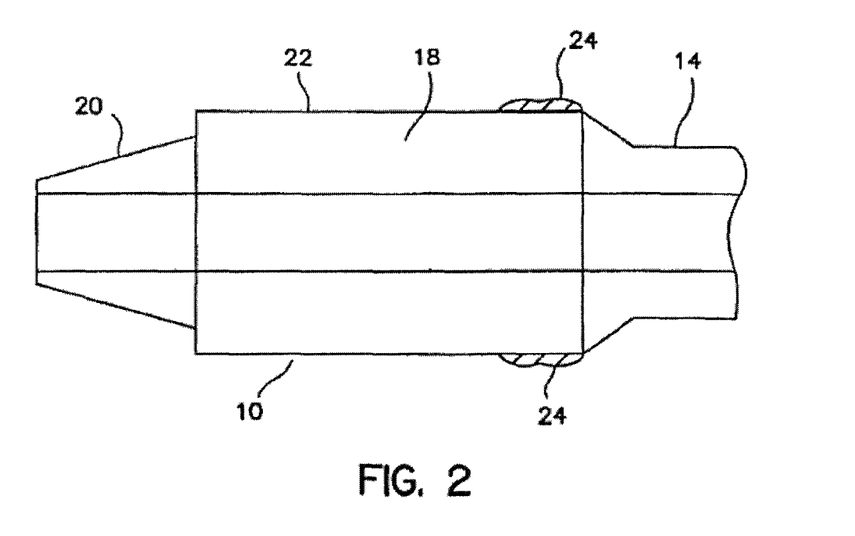
FIG. 2 is a view similar to FIG. 1 illustrating a pin of the tool joint with a raised hardband according to one embodiment.

Referring now to FIGS. 1 and 2, one example of a downhole tool, in particular, a drill pipe joint that has been provided with hardbanding by friction stir welding is shown. As shown in FIGS. 1 and 2 a tool joint 10 for drill pipe 14 is illustrated as having a box 12 at the end of the drill pipe 14 that is internally threaded at 16. Internal threads 16 of box 12 threadedly receive a pin 18 having co-acting threads 20 to the threads 16 so that the pin 18 may be threaded into box 12. The pin 18 forms the end of a drill pipe, such as 14, so that a string or joints of pipe may be threadedly secured together and disconnected for drilling oil, gas, and other wells.

The box 12 and the pin 18 are enlarged and have outer cylindrical surfaces 22 having an outer diameter greater than the outer diameter of the drill pipe 14 onto which hardbanding 24 is deposited. In such an embodiment, the outer diameter of the coupling at the hardband 24 is greater than the outer cylindrical surfaces 22 such that the hardband preferentially contacts the borehall wall or casing when the tool joint is employed in a drill string. One skilled in the art would appreciate that when selecting the outer diameter of the hardband 24, care should be taken, with consideration as to the borehole diameter in which the drill string is being used to reduce adverse effects on annular flow of drilling fluids through the borehole to the surface. For example, such thickness of the hardbanding may range from about about 3/32 to 1/4 inch thick without detriment to the alloy properties and may be deposited in single or double layers.

Figure 3:
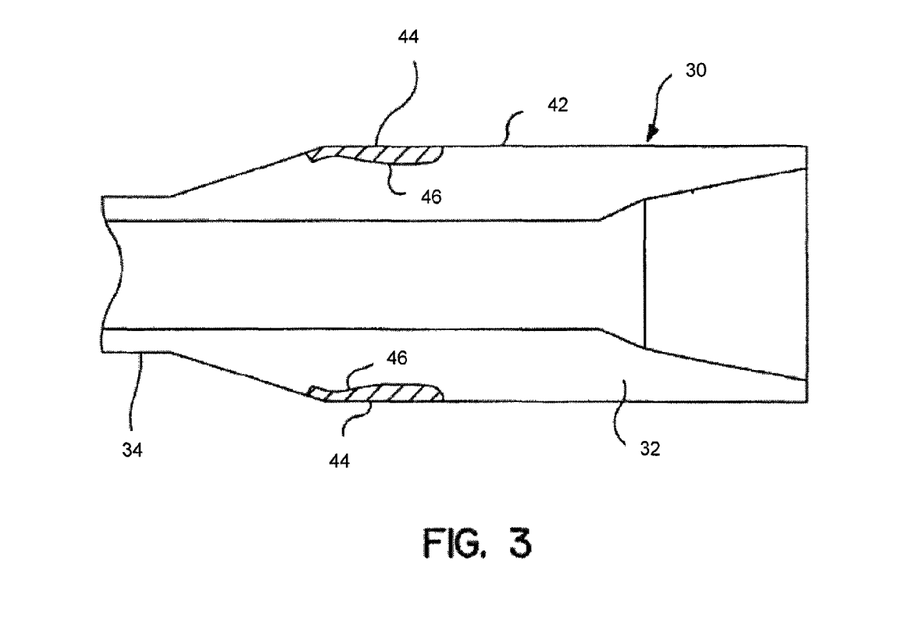
FIG. 3 is a view similar to FIG. 1 illustrating flush hardbanding of a box of the tool joint according to another embodiment.
Figure 4:
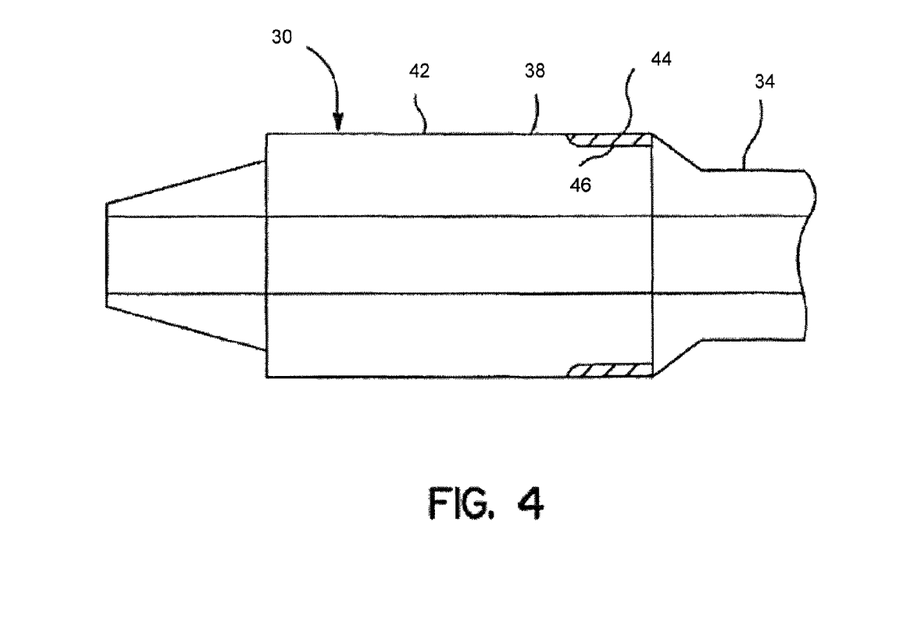
FIG. 4 is a view similar to FIG. 1 illustrating flush hardbanding of a pin of the tool joint according to another embodiment.

Referring now to FIGS. 3 and 4, another embodiment of a tool joint 30 for drill pipe 34 is shown. Tool joint 30 is similar to tool joint 10 of FIGS. 1 and 2 except that tool joint 30 has a reduced cylindrical portion 46 formed by either the removal of a circumferential band of material from the outer cylindrical surfaces 42 of the box 32 and the pin 38 or was originally formed with these reduced diameter sections 32, and the hardbanding 44 is welded in this space so that the surface of the weld deposited hardfacing is substantially flush with the outer cylindrical surface 42 of the box 32 and the pin 38. One skilled in the art would appreciate that when a flush hardbanding is desired, an amount of material similar to the thickness of the hardband 24 shown in FIGS. 1 and 2 may be removed from the tool joint 30 so that a similar thickness of hardband 44 may be deposited thereon and be flush with the outer surfaces 42.

Figure 5:
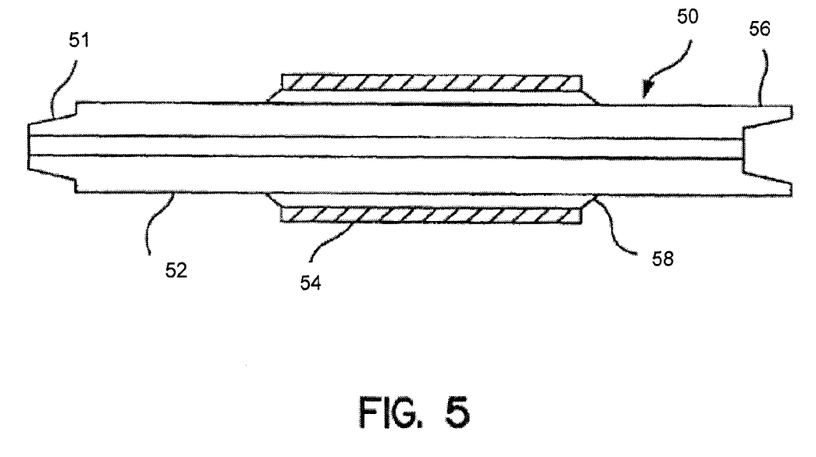
FIG. 5 is a longitudinal view of a stabilizer hardbanded according to one embodiment.
Figure 6A:
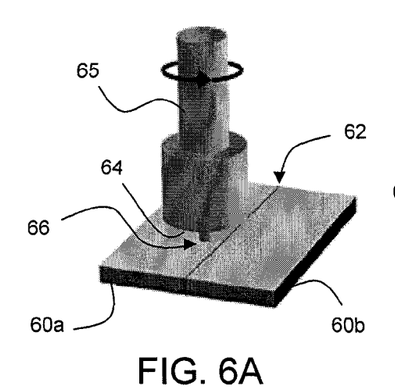
FIGS. 6A to 6D illustrate use of a friction stir welding tool in accordance with one embodiment.
Figure 6B:
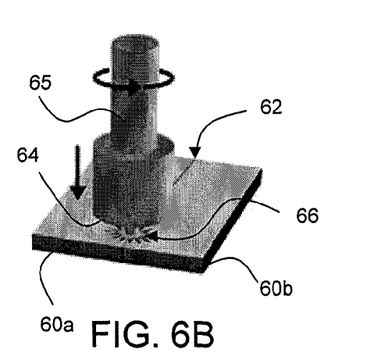
Figure 6C:
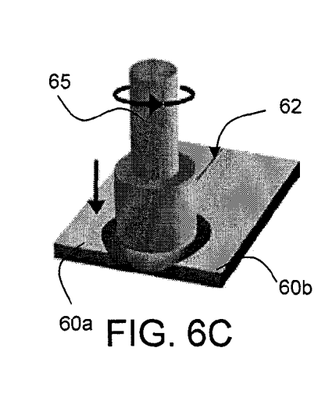
Figure 6D:
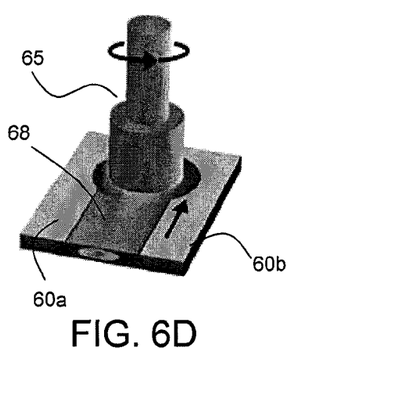
Figure 7A:
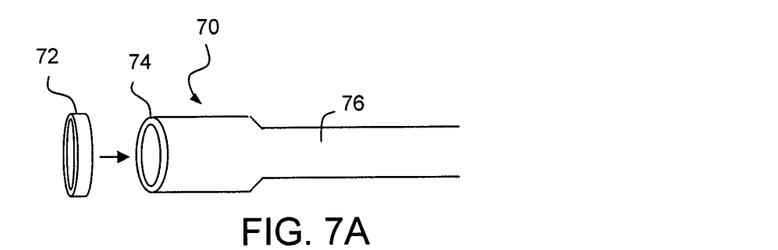
FIGS. 7A to 7D illustrate formation of a weld in accordance with one embodiment.
Figure 7B:
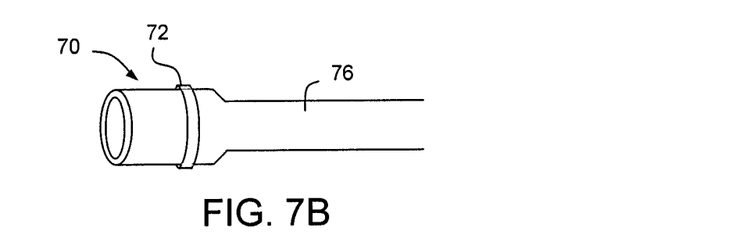
Figure 7C:
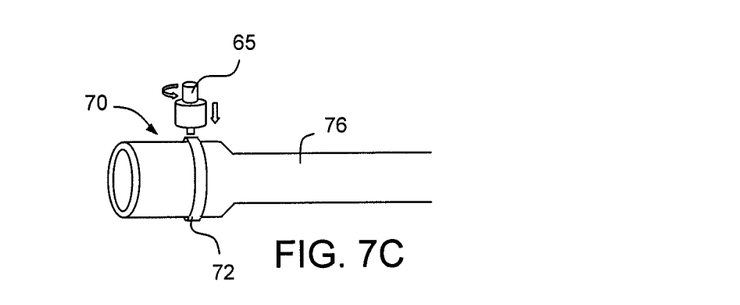
Figure 7D:
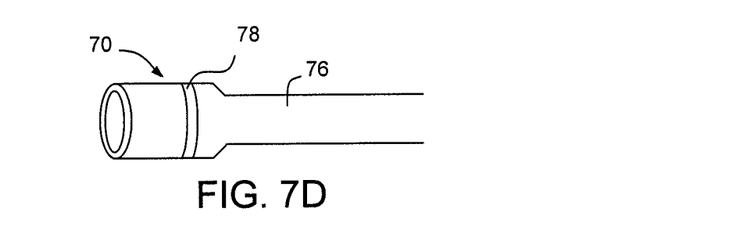

Referring to FIG. 5, a stabilizer 50 according to the present disclosure is illustrated. Stabilizier 50 has an elongated cylindrical or pipe-like body 52 having a pin 51 and box 56 for connection in a string of drill pipe (not shown). The stabilizer 50 possesses stabilizer ribs 58 extending outwardly from body 52 for stabilizing the drill pipe in a well bore (not shown). Hardbanding alloy 54 is welded to stabilizer ribs 58. Further, while the methods of the present disclosure is particularly suited for hardbanding tool joints and stabilizers, it may be applied to any surface requiring hardbanding or facing, such as drill collars, structural members, process components, abrasion resistant plates, and the like.

Thus, while the present application is directed to the general use of friction stir welding to weld a hardfacing alloy to the outer surface of a downhole tool, specific embodiments are also directed to the various techniques by which a hardfacing alloy may be provided to, located relative to, and affixed to the underlying tool surface. For example, the hardfacing alloy may be provided in a variety of shapes and forms. One example embodiment, shown in FIGS. 7A to 7D, may include a preformed sleeve 72 of a hardfacing alloy for use with a tubular member. A sleeve (full or split) 72 may be slid onto a box end 74 of a joint 70 of pipe 76, where the box end 74 has a larger outer diameter as compared to the remainder of the pipe 76. It may be located (and temporarily affixed) at the region of joint 70 desired to have wear protection. A friction stir welding tool 65 (having shoulder and pin components as described above) may be brought into contact with sleeve 72. As the tool 65 rotates and is forced normal to the surface of the sleeve 72/joint 70, frictional heating generated from the rotation of the tool 65 softens the material of the sleeve 72 and joint 70 (in the area proximate the sleeve 72) in the vicinity of the rotating tool 65, thereby inducing a plasticization and commingling of material from the sleeve 72 and joint 70 to form a hardband 78 welding onto the surface of joint 70. Further, while sleeve 72 may be located on joint 70 simply by sliding the sleeve to the desired location, sleeve 72 may optionally be interference fit or tack-welded to the desired location.

Moreover, while a sleeve is generally considered to a relatively rigid material (not readily deformable during the positioning of the alloy on the tool), other embodiments may use a non-rigid, malleable material that may be somewhat deformed during the positioning of the alloy on the tool. For example, instead of a preformed sleeve of material, a preformed, malleable width of alloy (for example, wire or wider strip) may be positioned on the tool, taking the general shape-form of the tool surface (i.e., for a tubular member, a wire or strip of alloy may be wrapped around the circumference of the tubular). Thus, such materials may be supplied in (or formed to have) various widths, ranging from several millimeters to several centimeters, for example, from about 5 mm to about 5 cm. However, one skilled in the art would appreciate that smaller or larger widths may also be used. Thus, depending on the size, the materials may be formed such as by wire-drawing or by high shear compaction (or tape-casting) methods known in the art.

Further, to aid in relative placement of such malleable materials on a tool, a tackifying agent or adhesive may be used so that the alloy may be accurately placed in the desired location of the tool. Upon placement of the alloy on the tool, the alloy and tool part may be welded together, similar to as described above, using friction stir welding. Alternatively, it is also within the scope of the present disclosure that such a malleable material is continuously fed onto (or wrapped around) a tool ahead of the friction stir welding tool moving along the metal-tool interface yet to be welded.

Figure 8:
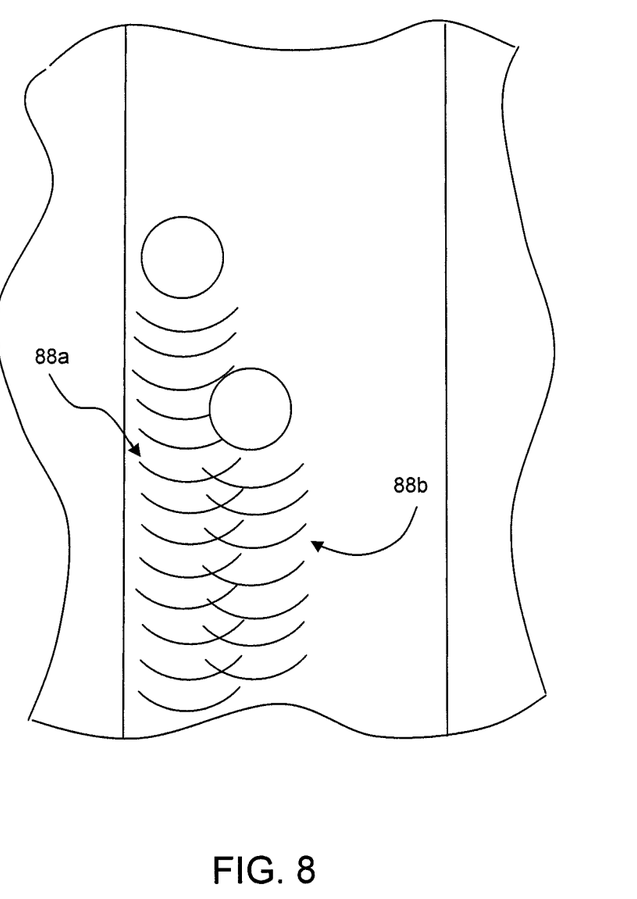
FIG. 8 is a schematic of one embodiment of a hardband weld.

Moreover, it is also within the scope of the present disclosure that during the welding process, welding the entire hardband region may be accomplished in one or more passes, depending, for example, on the width of the material to be welded to the tool. Thus, for example, for a hardband wider than an available friction stir welding tool, multiple passes of welding 88a, 88b may be performed, such as shown in FIG. 8. During such multiple passes, some embodiments may change the direction of rotation of the tool while other embodiments may use the same rotation direction between the multiple passes. Further, one skilled in the art would appreciate that during the welding process, some of the base material adjacent the desired or newly formed weld may also be stirred despite not having an additional material mixed therewith.

A byproduct of the welding techniques of the present disclosure may be a reduction in the surface roughness, i.e., reduced asperity heights. For example, in one embodiment, a hardband applied using the methods of the present disclosure may have a reduced asperity height as compared to a conventionally applied weld.

Further, the hardbanding of the present disclosure is generally repairable. Thus, in particular, the downhole components may be repeatedly recoated with a hardbanding layer, either in a shop or in the field at the rig location. Further, when performing a re-coat, the friction stir welding of a new metal alloy into the used pipe may be performed on the same or different earlier weld type.

Advantageously, embodiments of the present disclosure may provide for at least one of the following aspects. Conventional welding processes present limitations on the types of hardbanding materials that can be used in hardbanding a downhole toole. For example, using welding techniques conventionally used in hardbanding, e.g., gas metal arc welding, the hardbanding material options are limited. Specifically, materials that are casing friendly are difficult to weld, and result in cracking (despite pre- and post-heat treatments) due to the stresses which arise in the microstructure during the liquid-to-solid transition during welding. Moreover, materials which are more easily weldable using conventional means (such as conventional tungsten carbide containing hardbands) are known to wear down a casing string.

However, using the welding methods of the present disclosure, the number of materials that may be used with the friction stir welding techniques does not posses the same limitations associated with conventional gas arc welding. By having fewer (or no) limitations on the types of material that may be used, the techniques may be used to apply welds that are either casing or open-hole friendly. Further, in addition to having broader choice in hardband materials, the solid-state processing principles associated with friction stir welding may likely reduce the microstructure defects, reducing the incidence of cracking. By reducing the incidence of cracking, the need for additional heat processing treatments, such as pre- and/or post-heat treatments may be eliminated. Additionally, the welding technique may be less hazardous, which may also allow for the hardbanding to be placed at any given location, including at the rig site, allowing for better rebuild service. Lower asperity heights may also be achievable, giving a smoother finish, and reducing an apparent need for surface finishing or grinding.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for applying a wear reducing material to a tubular member used in a wellbore operation, comprising:
    locating a preformed sleeve of a high melting temperature hardfacing alloy concentric with an outer surface of the tubular member at a desired location, wherein the hardfacing alloy comprises a ferrous based alloy; and
    welding the preformed sleeve to the outer surface of the tubular member, wherein the welding comprises plasticizing and commingling the hardfacing alloy and the tubular member surface by friction stirring the hardfacing alloy into the tubular member's outer surface,
    wherein the entire region of the preformed sleeve is friction stirred into the tubular member's outer surface.

2. The method of claim 1, wherein the locating comprises tack-welding the preformed sleeve to the desired location of the tubular member.

3. The method of claim 1, wherein the locating comprises interference fitting the preformed sleeve to the desired location of the tubular member.

4. The method of claim 1, wherein the welding comprises at least one welding pass.

5. The method of claim 4, wherein the welding comprises at least two welding passes.

6. The method of claim 1, wherein friction stirring comprises exerting a downward force onto and rotating a friction stir welding pin to generate frictional heat such that the pin enters the alloy and tubular member surface and creates a plasticized region in the alloy and the tubular member.

7. The method of claim 1, wherein the hardfacing alloy comprises tungsten carbide particles dispersed therein.

8. The method of claim 1, wherein the welded wear reducing material has a hardness ranging from about 50 to 70 Rockwell C.

9. The method of claim 1, wherein the locating comprises continuously feeding the preformed sleeve ahead of a friction stir welding tool performing the welding.

10. The method of claim 9, wherein the welding comprises at least one welding pass.

11. The method of claim 10, wherein the welding comprises at least two welding passes.

12. The method of claim 1, further comprising:
    applying an adhesive between the preformed sleeve and the tubular member.

13. The method of claim 9, wherein the friction stir welding tool includes a shoulder and a welding pin extending downward from the shoulder.

14. The method of claim 13, wherein one or both of the shoulder or the welding pin has a superabrasive coating thereon.

15. The method of claim 1, wherein the preformed sleeve is rigid.

16. The method of claim 1, wherein the preformed sleeve is malleable.

17. The method of claim 1, wherein a thickness of the hardfacing alloy is between 3/32 inch and 1/4 inch.

18. The method of claim 1, wherein the outer surface of the tubular member is an outer surface of a downhole tool.

19. The method of claim 1, wherein the outer surface of the tubular member is an outer surface of a tool joint of a drill pipe.

20. The method of claim 19, wherein the outer surface of the tool joint is an outer surface of a box end of the tool joint.

* * * * *

UNITED STATES PATENT AND TRADEMARK OFFICE
CERTIFICATE OF CORRECTION

PATENT NO. : 8,763,881 B2
APPLICATION NO. : 12/541651
DATED : July 1, 2014
INVENTOR(S) : Madapusi K. Keshavan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 35 days.

Signed and Sealed this
Twelfth Day of April, 2016

Michelle K. Lee
*Director of the United States Patent and Trademark Office*